United States Patent [19]

Bokon

[11] Patent Number: 4,563,867
[45] Date of Patent: Jan. 14, 1986

[54] MOWER MEANS

[76] Inventor: William S. Bokon, 6111 Geremander Ave., Rialto, Calif. 92376

[21] Appl. No.: 321,596

[22] Filed: Nov. 16, 1981

Related U.S. Application Data

[63] Continuation-in-part of Ser. No. 237,379, Feb. 23, 1981, abandoned, which is a continuation-in-part of Ser. No. 54,132, Jul. 2, 1979, abandoned, which is a continuation of Ser. No. 816,291, Jul. 18, 1977, abandoned, which is a continuation-in-part of Ser. No. 661,157, Feb. 25, 1976, abandoned.

[51] Int. Cl.$^4$ ............................................. A01D 55/20
[52] U.S. Cl. ........................................ 56/249; 56/294
[58] Field of Search ................ 56/295, 249, 252, 12.8, 56/13.3, 249.5, 294

[56] References Cited

U.S. PATENT DOCUMENTS

| | | | |
|---|---|---|---|
| 1,844,750 | 2/1932 | Ellis | 56/13.1 |
| 2,063,067 | 12/1936 | Waller | 56/252 |
| 2,282,238 | 5/1942 | Newton | 56/252 |
| 2,484,071 | 10/1949 | Brauer | 56/252 |
| 2,533,691 | 12/1950 | Remonte | 56/249 |
| 2,640,309 | 6/1953 | Benson | 56/294 |
| 2,772,533 | 12/1956 | Shibley | 56/252 |
| 2,827,751 | 3/1958 | Mascaro | 56/294 |
| 3,430,421 | 3/1969 | Matthews | 56/12.9 |
| 3,783,592 | 1/1974 | Schraut | 56/13.3 |

Primary Examiner—Paul J. Hirsch
Attorney, Agent, or Firm—John H. Crowe

[57] ABSTRACT

A lawn mower has a transverse cutting bar, but instead of a reel-type cutter to cooperate therewith, a rotary cutter is employed that has a plurality of curved cutting edges that maintain constant contact with the transverse cutting bar and repeatedly traverse the cutting bar with the cutting bar positioned more or less tangentially of the curved cutting edges. In all embodiments of the invention, the cutting edges are substantially circular and concentric as viewed along the axis of the rotary cutter, and in at least most embodiments the rotating cutting edges eliminate hazard to the operator by pushing away out of harm any part of the operator's body that may inadvertently intrude into the zone of the cutting operation. In the presently preferred embodiment, the cutting edges are the peripheral edges of a plurality of spaced discs that are inclined to wobble along the transverse cutting bar. Each disc reciprocates along a portion of the length of the transverse cutting bar with the ranges of reciprocation overlapping to result in a smooth cutting swath. Arrays of resilient filaments may be mounted on the rotary cutter to encounter the transverse cutting bar and thus flick loose material into a blower for conveyance away from the cutting zone. A pivoted device to sharpen the cutting edges may be temporarily mounted on the mower frame.

11 Claims, 39 Drawing Figures

MOWER MEANS

CROSS-REFERENCE TO RELATED APPLICATIONS

This application is a continuation-in-part of my copending U.S. application Ser. No. 06/237,379, filed Feb. 23, 1981, now abandoned, which is, in turn, a continuation-in-part of my U.S. application Ser. No. 06/54,132, filed July 2, 1979, now abandoned. U.S. application Ser. No. 06/054,132 was a continuation of my U.S. application Ser. No. 816,291, filed July 18, 1977, now abandoned. U.S. application Ser. No. 816,291 was a continuation-in-part of my U.S. application Ser. No. 661,157, filed Feb. 25, 1976, now abandoned.

BACKGROUND OF THE INVENTION

This invention relates to a lawn mower that differs from conventional lawn mowers in that it is free from any significant hazard to the operator.

In general, there are two types of lawn mowers, the reel-type and the rotary-type. The reel-type mower has a transverse cutting bar at an adjusted cutting height and has a cutter assembly in the form of a reel with peripheral blade elements that cooperate with the transverse cutting bar in a scissor-like cutting operation. Since the cutting reel is power actuated, inadvertent intrusion into the cutting zone of any part of the operator's body can and often does result in serious physical injury. Moreover, if the lawn mower encounters a piece of wire, it can pull on the wire and seemingly aggressively attack the operator. Knee cap injuries occur in this manner. Hundreds of injuries are reported each year, and only a fraction of such injuries are officially recorded.

The so-called rotary-type mower employs a cutting blade that rotates at high speed in a horizontal plane at a selected mowing height. The rotating blade is covered on all sides by a protective shroud, but here again power actuation creates serious risks. If the rotary blade encounters an obstacle, the reaction can cause the mower to jump or to tilt to an angle that exposes the cutting blade to some part of the operator's body.

SUMMARY OF THE INVENTION

The invention is similar to a reel-type mower in that it employs a transverse cutting bar in cooperation with a rotary cutter assembly, but the primary objective of hazard-free operation is achieved by a different type of rotary cutting assembly and a different mode of cooperation between the transverse cutting bar and the new rotary cutter assembly.

In one embodiment of the invention, the rotary cutter assembly comprises three axially spaced discs on a common shaft, which discs are inclined at an angle to the axis of rotation and are of generally oval configuration in face view to wobble and thus reciprocate along portions of the transverse cutting bar. The ranges of reciprocation overlap to result in a clean mower swath.

In a second embodiment of the invention, the rotary cutter assembly that cooperates with the transverse cutting bar has helical blade means, the helical blade means being constructed in the general manner of the screw-type conveyor. Thus, all the curved cutting edges traverse the transverse cutting bar in one direction only.

Both embodiments of the invention have certain characteristics in common. In each instance, the cutting blades are of circular profile configuration as viewed along the axis of the shaft of the rotary cutter assembly. In each instance, the cutting edges maintain constant contact with the cutter bar and repeatedly shift along the transverse cutter bar not only for the purpose of carrying out the cutting operation, but also for the highly important purpose of pushing away from the cutting zone any part of the operator's body that may inadvertently intrude into the zone.

Another object of the invention is to provide a kit for converting a conventional reel-type mower into a mower having the now hazard-free mode of operation. The kit comprises the new type rotary cutter assembly to be substituted for a conventional reel-type cutter assembly. A feature of the invention in this regard is the provision of a cutter assembly with removable trunnions on its opposite ends. The trunnions may have external screw threads to fit into screw-threaded sockets on the opposite ends of the cutter assembly. Such trunnions may be selected from interchangeable sets of trunnions of different sizes to provide a rotary cutter assembly that may be journaled in the particular bearings of a particular conventional reel-type mower.

A further object of the invention is to provide an apparatus which in summer may function as a lawn mower and in winter may function as a snow thrower to clear paths through snow. The cutter assembly loosens the snow and a blower projects the loosened snow away from the path of travel of the apparatus. A suitable forward ramp may be added to scoop up snow that lies below the level of the transverse cutter bar.

A still further object of the invention is to provide means to pick up debris such as leaves that litter a lawn and are not easily accessible. This object is attained by use of a blower and by resilient filaments carried by the rotary cutter assembly. The resilient filaments, which may be strands of spring wire, are momentarily flexed by encountering the transverse cutter bar and recover with snap action which flicks the loose leaves into the airstream of the blower. The shifting blades disturb the grass to promote access to the leaves, and fortuitously the flicking filaments not only act on the leaves, but also remove grass cuttings from the cutting zone.

A feature of the invention is the further concept of providing an independent control for the blower. It has been discovered that operating the blower only intermittently results in more effective disposal of the grass cuttings. In addition, it has been found that permitting the grass cuttings to accumulate at the idle blower during the mowing of a swath permits periodically energizing the blower to deposit accumulated cuttings in mass at a selected spot outside of the area that is being mowed.

Another object of the invention is to provide means for quickly and efficiently sharpening the cutting edges of the blades when desired. For this purpose a special sharpening device is adapted to be temporarily mounted on the mower in a pivoted manner to be normally swung into contact with the cutting edges.

The various features and advantages of the invention may be understood that the following detailed description and the accompanying drawings.

BRIEF DESCRIPTION OF THE DRAWINGS

In the drawings, which are to be regarded as merely illustrative.

DESCRIPTION OF THE PREFERRED EMBODIMENTS

The first embodiment of the invention shown in FIGS. 1-8 is identical in large part to a conventional reel-type mower and therefore need not be described in detail. The sole difference from a conventional reel-type mower is in the substitution of a rotary cutter assembly that is generally designated by the numeral 10 for the conventional reel-type cutter assembly.

In a well-known manner, an engine 12 controlled by a throttle 14 is operatively connected to the rotary cutter assembly 10 by a clutch 15 that is operated by a control 16 on the handle 18 of the mower. The clutch drives a sprocket (not shown) in a housing 20, which sprocket is connected by a sprocket chain 22 (FIG. 2) to a second sprocket 24 on the cutter assembly 10. In a well-known manner, the cutter assembly 10 is operatively connected by gearing (not shown) to the two ground wheels 25 of the mower. The cutter assembly 10 and the ground wheels 25 rotate in the same direction.

The frame 26 of the mower is supported as usual by the two ground wheels 25 and rearward roller means 28. A transverse cutting bar or blade 30 is mounted by suitable cap screws 32 (FIG. 3) on a cross bar 34 of the frame 26. The cutter bar 30 is the conventional ledger plate or bed knife cutter bar of a conventional reel-type mower.

The rotary cutter assembly 10 has a tubular shaft 35, which is extended by stub shafts 36 that are journaled in the usual bearings 38 of a conventional mower. The two stub shafts 36, which are provided with suitable bushings 40, are operatively connected to the usual gearing (not shown) for driving the two ground wheels 25.

Figure 7:
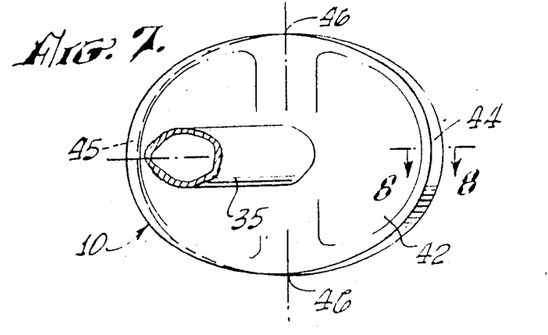
FIG. 7 is a face view of a cutting disc as seen along the line 7—7 of FIG. 2 showing the opposite bevels on opposite edges of the cutter discs.

Rigidly mounted on the tubular shaft 35 are three spaced cutter discs 42 of the generally oval or eliptical configuration shown in FIG. 7. One end of each elongated cutter disc 42 is formed with a bevel 44 that is inclined in one direction, and the other end of the elongated cutter disc is formed with a similar bevel 45 that is inclined in the opposite direction. The two bevels 44 and 45 merge at two diametrically opposite transition points 46, where the cutting edge of the disc is perpendicular to the plane of the disc. Since the cutter discs 42 are inclined at an acute angle to the axis of the tubular shaft 35, the three cutter discs wobble in unison in response to rotation of the tubular shaft, and the cutter discs are so shaped and dimensioned that the peripheral cutting edges of the cutter discs maintain continuous contact with the cutter bar 30.

Figure 4:
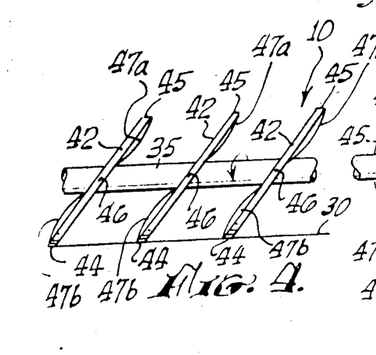
FIGS. 4, 5 and 6 are diagrammatic views showing how the wobbling cutter discs reciprocate along the transverse cutting bar.
Figures 5, 6:
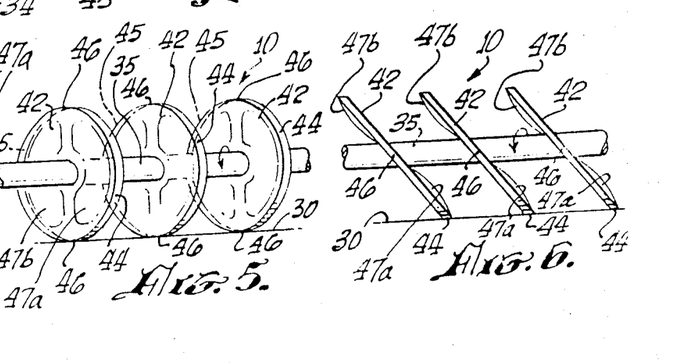

FIG. 4 indicates how the bevels 44 of the cutter discs 42 make contact with the transverse cutter bar 30 at one extreme tilt angle of the cutter discs. FIG. 5 shows intermediate positions of the cutter discs 42 as they shift toward their opposite extreme angles shown in FIG. 6. In FIG. 5 the transition points 46 of the three cutter blades make contact with the transverse cutter bar 30, and in FIG. 6 the bevels 45 of the three cutter blades make contact with the transverse cutter bar.

The first embodiment of the invention also incorporates the concept of offsetting or dishing the opposite halves of each blade 42 to make the blade have somewhat cup-shaped recesses for more effectively discharging material cut by the traveling mower. Referring to FIG. 4, the upper half of each blade 42 has an offset 47a to the right which forms a shallow recess that faces toward the left. In like manner the bottom half of each blade has a leftward offset 47b which forms a right facing recess. It is to be noted that the recesses in the two halves of a blade face in opposite directions. As indicated in FIG. 5 each of the offsets 47a and 47b extends over nearly 180 degrees of the circumference of a circular blade.

A feature of the invention is that it may be in the form of a kit for conversion of a conventional reel-type mower into a mower having the new mode of operation. The kit consists simply of a rotary cutter assembly 10 that is adapted for replacing a conventional reel-type cutter assembly. For this purpose, rotary cutter assemblies 10 may be stocked that have stub shafts 36 of different diameters so that a rotary cutter assembly may be selected from stock to fit the bearings 38 of any particular conventional reel-type mower. Instead of stocking a number of different rotary cutter assemblies 10 for this purpose, however, the invention teaches that a single rotary cutter assembly may be stocked with removable stub shafts that may be selected from interchangeable stub shafts of different sizes.

Figure 9:
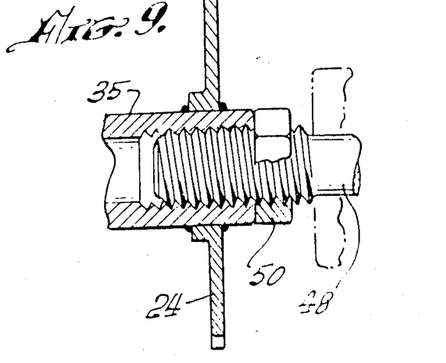
FIG. 9 is an enlarged fragmentary sectional view showing how each end of the rotary cutter assembly may be provided with a removable trunnion.

FIG. 9, by way of example, shows how the opposite ends of a tubular shaft 35 of a rotary cutter assembly may be internally screw threaded to receive externally threaded stub shafts 48 selected from various sets of stub shafts of different sizes. A lock nut 50 on each stub shaft 48 may be tightened against the end of the tubular shaft 35 for secure retention of the stub shaft.

Figures 8, 10, 11, 12, 13, 14:
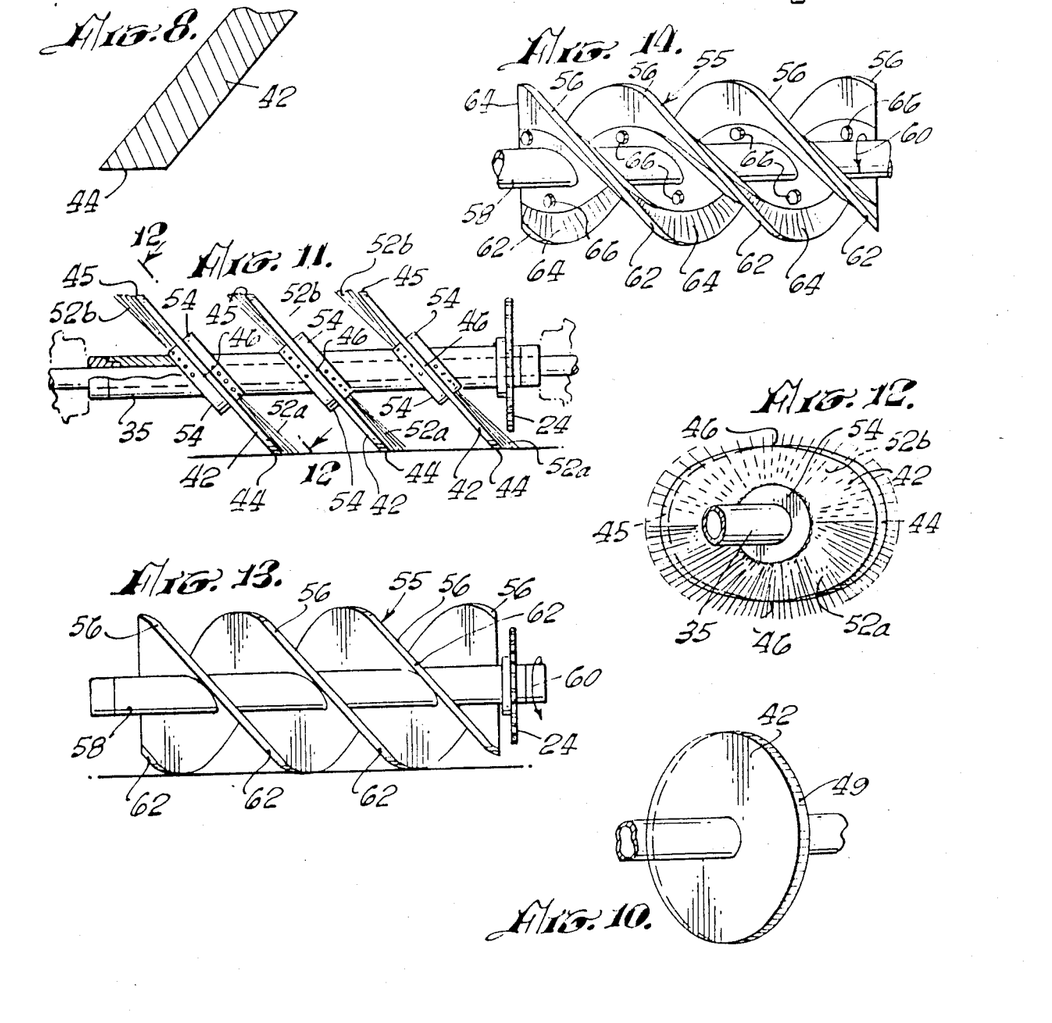
FIG. 8 is an enlarged fragmentary sectional view taken along the line 8—8 of FIG. 7.
FIG. 10 is a perspective view of a cutter disc with a serrated cutting edge.
FIG. 11 is a diagrammatic elevational view showing how the rotary cutter assembly may be provided with brush means comprising resilient wire filaments.
FIG. 12 is a face view of one of the tilted discs as seen along the line 12—12 of FIG. 11.
FIG. 13 is an elevational view illustrating a second embodiment of the invention in which the rotary cutter assembly comprises helical blade means.
FIG. 14 is a view similar to FIG. 13 showing how the helical cutter assembly may be equipped with brush means.

FIG. 10 indicates how the periphery of a cutter blade 42 may be formed with serrations 49 to increase the cutting efficiency of the blade. These serrations may, for example, consist of transverse grooves 1/32" wide and 1/32" deep with the grooves spaced apart by 1/32" so that transverse grooves form transverse cutting teeth 1/32" wide spaced apart by 1/32".

FIGS. 11 and 12 indicate how a rotary cutter assembly may be provided with brushes or arrays 52a and 52b of spring steel filaments for the purpose of flicking loose material rearward into the intake of a blower (not shown) that conveys the loose material away from the cutting zone. By way of example, FIGS. 11 and 12 show the opposite faces of the cutter discs 42 equipped with rings or hubs 54 in which the arrays of filaments are mounted.

It is contemplated that the brush arrays 52a, 52b will be mounted on the trailing sides of the bevel edges 44, 45 as the bevel edges advance along the transverse cutter bar 30. Thus in FIGS. 11 and 12 each cutter disc 42 has a brush array 52a mounted on one half of the cutter disc to follow the bevel 44 of the cutter disc as the bevel moves leftward as viewed in FIG. 11. In like manner, the other half of each cutter disc 42 is provided with a filament array 52b to trail the bevel 45 of the cutter disc as the bevel progresses rightward along the cutter bar 30. Thus the two filament arrays 52a and 52b are on opposite faces as well as on opposite halves of the cutter discs.

The filament arrays 52a and 52b extend well beyond the peripheries of the cutter discs 42 so that they encounter the transverse cutter bar 30 and are flexed momentarily by the cutter bar. The flexible filaments are released from the cutting bar with snap action to cause the flexible filaments to pick up and flick loose material rearward from the cutting zone and thus make the loose material airborne for the purpose of permitting the loose material to be entrained by the airstream of a blower.

FIG. 13 illustrates a second embodiment of the invention in which a rotary cutter assembly, generally designated 55, comprises a plurality of helical blades 56 mounted on a tubular shaft 58 that is driven in the usual manner by a sprocket 24. With the rotary cutter assembly 55 rotating in the direction indicated by the arrow 60, which is the direction of rotation of the ground wheels 25, the successive cutting edges 62 of the helical blades traverse the transverse cutter bar 30 from right to left as viewed in FIG. 12. It is to be noted that the traversing cutting edges 62 not only cooperate with the cutter bar 30 for the mowing operation, but also serve the purpose of eliminating hazard to the operator by pushing out of harm any part of the operator's body that may inadvertently intrude on the cutting operation.

FIG. 14 indicates how the rotary cutter assembly 55 may be equipped with arrays 64 of resilient filaments for the previously described flicking action. The filament arrays 64 are positioned to trail the cutting edges 62 as the cutting edges traverse the cutter bar 30 from right to left. The filament arrays 64 may be carried by helical members 65 that are removably secured to the helical blades 56 by cap screws 66.

Figures 15, 16, 17, 18:
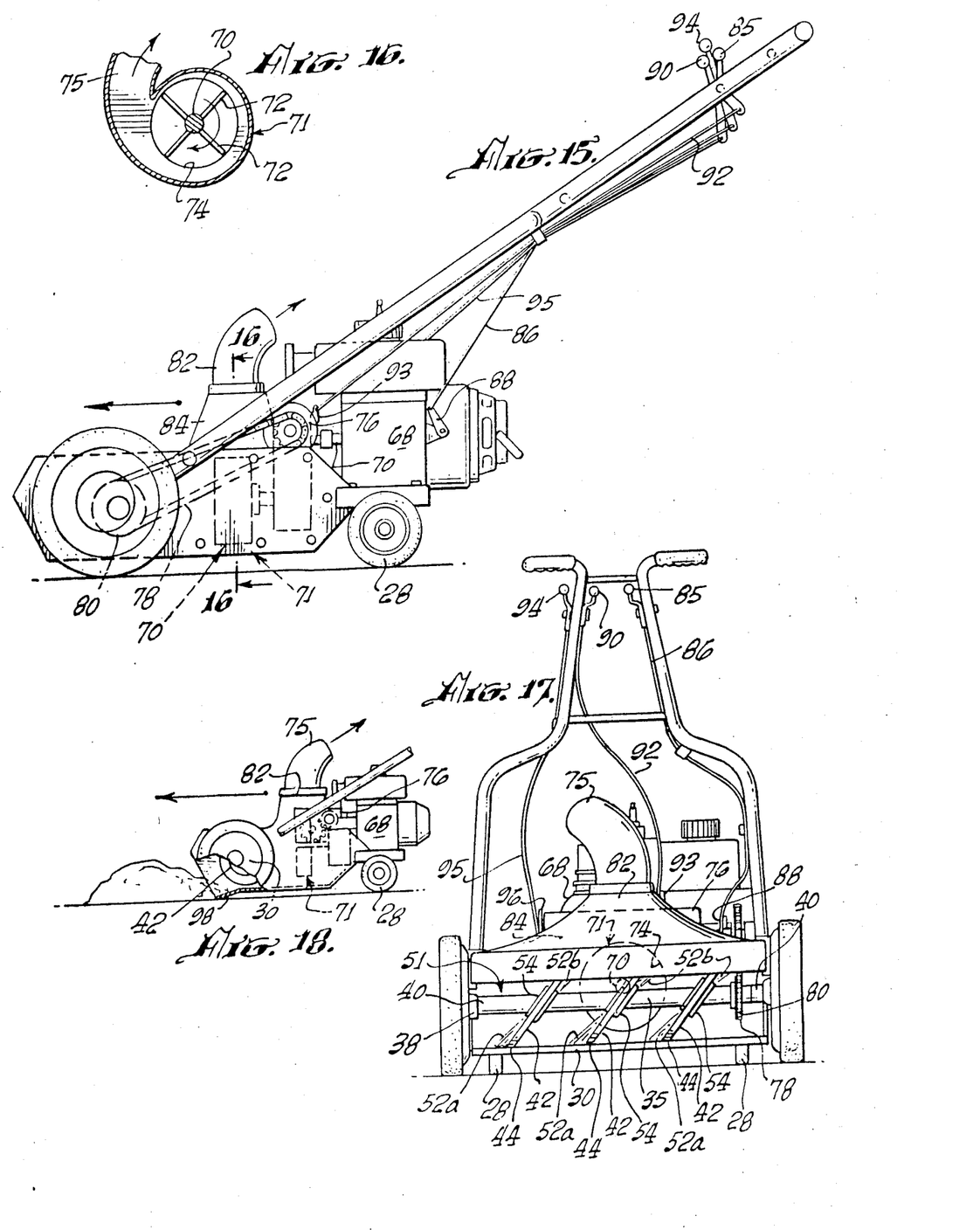
FIG. 15 is a side elevational view of a mower that is equipped with a blower to convey grass cuttings away from the cutting zone.
FIG. 16 is a section along the line 16—16 of FIG. 15 showing the construction of the blower.
FIG. 17 is a front elevational view of the mower that is shown in FIG. 15.
FIG. 18 is a side elevational view showing how the mower may be converted into a snow thrower.

FIGS. 15–17 show how a mower of this type may be constructed for unusual efficiency in not only mowing a swath of grass, but also in picking up leaves and other debris that may be entangled in the grass. A swath of grass cut in a leaf-littered lawn may be left so free of leaves that one would think that a vacuum cleaner, instead of a lawn mower, had been employed.

The lawn mower is powered by an engine 68 that has a forwardly extending shaft 70 (FIG. 15) that drives a well-known type of centrifugal blower 71 of the character that is indicated by FIG. 16. The shaft 70 carries a set of impeller blades 72 that extend across an axial intake port 74 to create an airstream that is discharged through a tangential output passage 75. The engine 68 is also operatively connected to gearing in a gear box 76, which actuates a sprocket chain 78 in the previously described manner to drive a sprocket 80 of a previously described rotary cutter assembly shown in FIGS. 11 and 12. As heretofore stated, the rotary cutter assembly 51 is equipped with arrays 52a and 52b of resilient filaments to pick up leaves in the grass and to flick the leaves rearwardly through a discharge tube 82 (FIG. 15) to the previously mentioned intake port 74 of the entrifugal blower. A suitable shroud 84 directs the flicked leaves from the cutting zone of the rotary cutter assembly 51 to the discharge tube 82.

The apparatus has three manual controls, namely, a control knob 85, which, as indicated by the numeral 86, is connected to the throttle 88 of the engine 63; a control knob 90, which, as indicated by the numeral 92, is connected to a control lever 93 of a clutch, which controls energization of the sprocket 80 of the rotary cutter assembly; and a control knob 94, which, as indicated by the numeral 95, is connected to an arm 96 of a conventional clutch on the shaft 70 that controls energization of the blower 71.

The provision of the third control 94 for controlling the blower 71 independently of the rotary cutter assembly makes possible a mode of operation that is highly advantageous. It has been found that as the mower travels with the rotary cutter assembly energized and with the centrifugal blower 71 de-energized by the clutch control 94, leaves and the grass cuttings are flicked by the arrays of resilient filaments into the shroud 84 to accumulate on the intake side of the blower 71. Thus the shroud 84 and the intake tube 82 serve as means to accumulate and store grass cuttings and leaves as the mower cuts a swath of the lawn. When the mower reaches the end of the swath, the blower 71 may be energized by means of the control 94 to discharge the accumulated grass cuttings and leaves in mass out through the output passage 75. The output passage 75 may direct the entrained material into a pile or may direct the entrained material into a bag (not shown) that is connected to the output passage only when the mower completes a swath. It has been found that this arrangement is not only highly useful in providing temporary storage for accumulated loose material, but also in greatly increasing efficiency in the discharge of loose material into the output passage 75.

FIG. 18 shows an embodiment which may function as a lawn mower in the summertime and may be employed as a snow thrower in the wintertime. The construction of the apparatus shown in FIG. 18 is largely similar to the construction of the embodiment shown in FIGS. 15-17, as indicated by the use of corresponding numerals to indicate corresponding parts. If such an apparatus is to be used as a snow thrower, however, the sprocket chain that drives the sprocket 80 in FIG. 15 is replaced by a simple train of gears (not shown) to connect the gear box 76 to the sprocket 80. This slight alteration is required because in the wintertime ice forms on a sprocket chain that is exposed to snow with the result that the sprocket chain soon breaks.

The only other change required to enable the apparatus to function as a snow thrower is the addition of a short sheet metal ramp 98, which scoops up the snow and lifts it to the level of the transverse cutter bar 30 to direct the scooped snow into the cutting zone of the rotary cutter assembly. The resilient filament arrays 52a and 52b may be employed since they are of some help. The rotary cutter assembly loosens the snow to facilitate the directing of the snow into the blower 71, the blower serving the purpose of discharging the snow away from the path of the apparatus.

FIGS. 19-22 show how a blade sharpening device, generally designated 100 may be temporarily mounted on a mower of the present type for the purpose of sharpening the blades. To adapt the mower for the mounting of the sharpening device 100 requires merely drilling coaxial bores 102 in the two previously mentioned gear boxes 25a, respectively, with the common axis of the two bores parallel with the axis of the tubular shaft 35 of the rotary cutter assembly 10.

Figures 20, 21, 22:
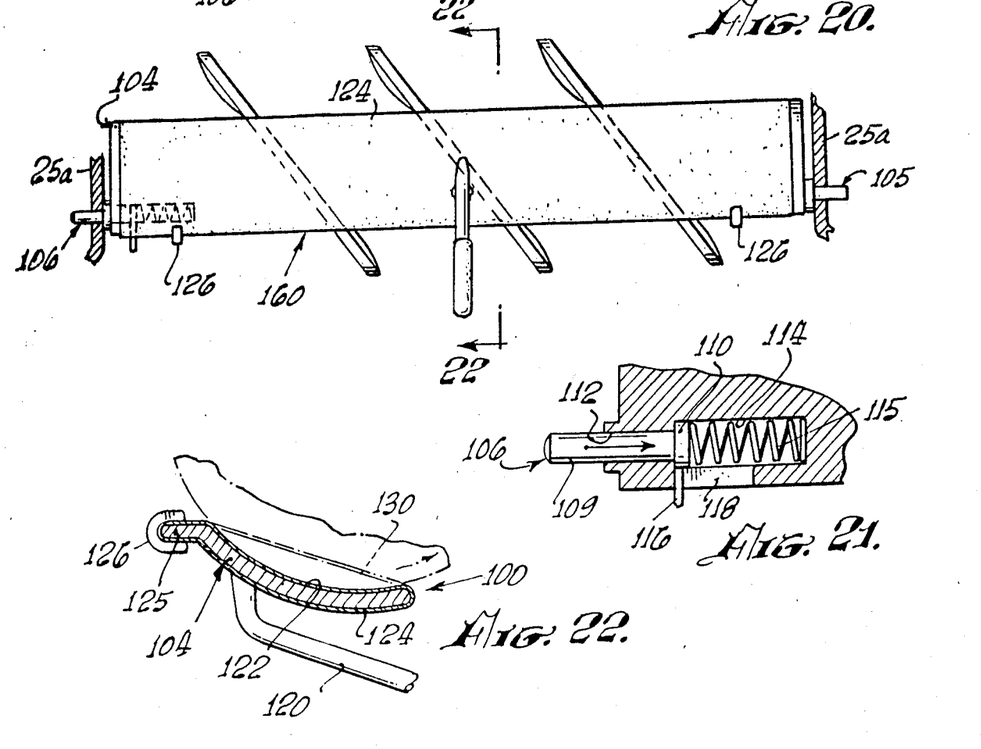
FIG. 20 is a fragmentary elevational view showing the sharpening device pivotally mounted on fixed structure of the mower.
FIG. 21 is an enlarged fragmentary section showing the construction of a retractible trunnion of the sharpening device.
FIG. 22 is a sectional view taken along line 22—22 of FIG. 20 showing the sharpening device in effective contact with the cutting edges of the blades of the mower.

The sharpening device 100 has an elongated body in the form of a metal plate 104 that is provided with two coaxial trunnions 105 and 106 at its opposite ends respectively to fit into the two coaxial bores 102. Trunnion 105 is fixed but trunnion 106 is retractible to make it possible to mount the sharpening device on the mower temporarily. As indicated in FIG. 21, the retractible trunnion 106 may be in the form of a pin 109 having an enlargement or head 110 on its inner end. The body of the pin is slidingly mounted in a bore 112 of the plate and the head 110 is slidingly mounted and captivated in a larger coaxial bore 114. A coil spring 115 in the larger bore 114 acts against the head 110 to urge extension of the pin. A small rod 116 extends laterally from the pin 109 through a slot 118 in the plate 104 to make it possible to retract the pin manually in opposition to the spring 115.

The sharpening device 100 is provided with a rigid handle 120 by means of which it may be pivotally swung towards and away from the peripheries of the cutter discs 12. The metal plate 104 of the sharpening device has a longitudinal surface 122 for sharpening action on the cuting edges of the cutter discs and this surface is of cylindrical curvature, being a longitudinal section of a cylinder that is defined by the cuting edges. When the sharpening device is manually rotated into contact with the cutting edges of the blades the surface 122 conforms to the curvature of the peripheries of the cutter discs.

The surface 122 is provided with abrasive particles to abrade the cutting edges of the discs and the abrasive particles may be bonded to the plate 104 by a suitable resin. In this particular embodiment of the invention, however, the abrasive particles are provided by what is commonly termed emery cloth in which the abrasive particles are bonded to a cloth backing. The abrasive particles may, for example, be particles of aluminum oxide or particles of carborundum.

FIG. 22 shows the sharpening device in operating position against the cutting edges of the blades with a strip 124 of emery cloth folded around the plate 104. In the construction shown the plate 104 has a longitudinal lip 125 on which suitable U-shaped spring clips 126 are removably mounted to anchor the opposite edges of the emery cloth 124. The lip 125 is shaped and dimensioned to place the spring clips 126 away from the cutting edges. The strip of emery cloth 124 is merely folded loosely around the plate 104 with the opposite edges of the emery strip engaged by the clips 126. Initially the emery cloth 124 may be spaced away from the cylindrically curved surface 122 of the plate 104 as indicated by the dotted line 130 in FIG. 22. When the sharpening device is swung into contact with the cutting blades, however, the emery cloth is pressed into intimate contact with the cylindrically curved surface 122.

Figure 19:
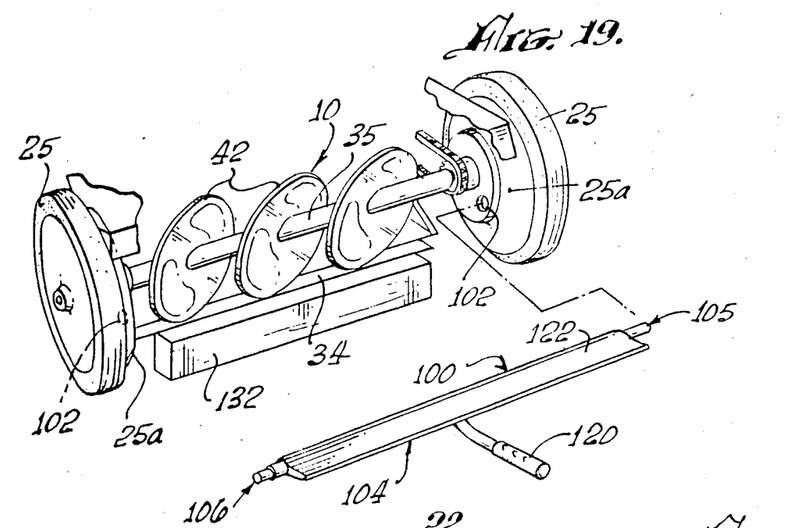
FIG. 19 is a fragmentary perspective view of the first embodiment of the invention together with a separate sharpening device that may be temporarily mounted on the mower for the purpose of sharpening the cutting edges of the blade.

In the recommended sharpening operation, a coarse emery cloth 124 is employed to remove high points caused by nicks in the cutting edges of the blades. The coarse emery cloth is then removed and is replaced by finer emery cloth to carry out the sharpening operation proper. During the sharpening operation the wheels 25 of the mower are, of course, power driven but the wheels are kept out of contact with the ground by elevating the mower by suitable means. FIG. 19 shows how a block of wood 132 may be employed for this purpose, the block being inserted under the crossbar 34 of the mower.

Figure 23:
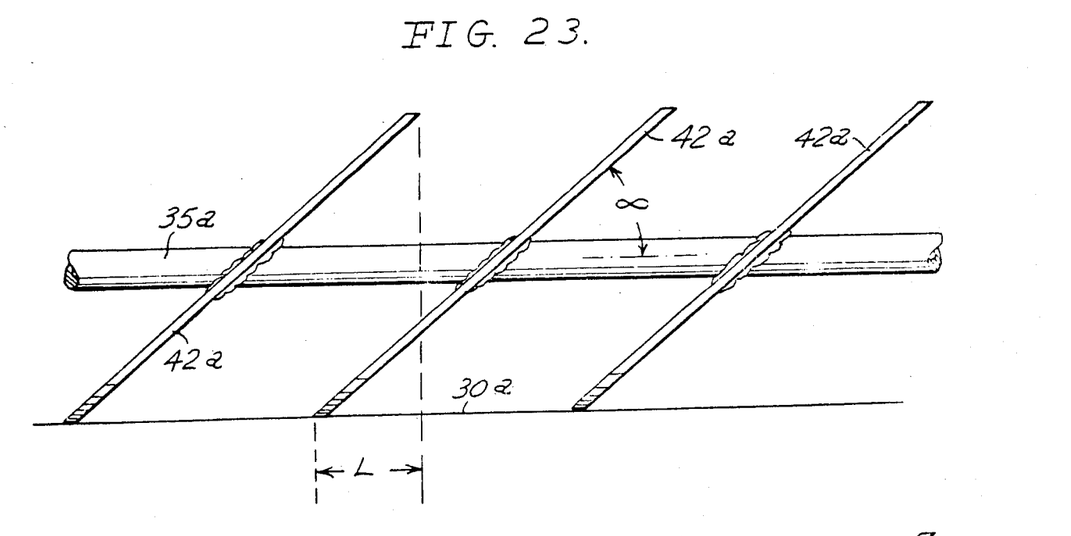
FIG. 23 is a view similar to that of FIG. 4, but drawn to an enlarged scale and showing the three cutter blades in flat, rather than dished, form, and showing each blade disposed at a 40° angle of inclination to the axis of the shaft on which it is mounted.
Figure 24:
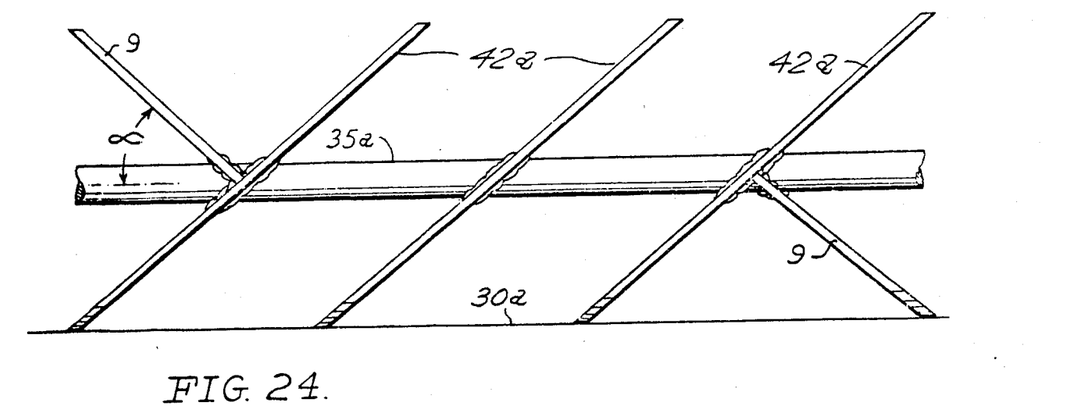
FIG. 24 is a view similar to that of FIG. 23, but showing an additional cutting element shaped substantially like the mirror image of half of one of the cutter blades attached to each end blade so as to extend away from that blade and the shaft in a manner to reciprocate along the cutting bar of the assembly in overlapping relationship with the range of reciprocation of the laterally outthrust half of said blade.

Although this has not been previously mentioned herein, it is critically important that in the cutter disc versions of my invention, each of the cutter discs be disposed at an angle no less than about 35 degrees or more than about 45 degrees with the axis of the shaft on which it is mounted. When this angle is below about 35 degrees, the mower will merely push or fan grass out of the way, rather than cut it. Where the angle is above about 45 degrees, the cutter discs must be rotated at an excessive speed and will not cut smoothly, but will leave ripples in the cut surface. Preferably, the angle should be from about 39 to about 41 degrees, inclusive, with 40 degrees being optimum. Each of FIGS. 23 and 24 shows three discs so angularly disposed on a common shaft. The discs and shaft are of like character in the two FIGS. 23 and 24 and are therefore designated by like numerls, 42a and 35a, respectively. For purposes of illustration, one of these 40-degree blade angles is graphically depicted at $\alpha$ in FIG. 23.

As previously indicated, the ranges of reciprocation of the cutter discs along the cuting bar should overlap to provide a neatly cut swath behind the cutter assembly. Unless there is such an overlap, the cut surface of the grass will be rippled. To prevent such a rippled effect, the overlap distance should preferably be at least approximately one-fifth the length of the major axis of the cutting discs. For example, if the discs have a major axis of ten and one half inches, the overlap should be at least two inches for best effect. The overlap distance between two of the cutter discs 42a is illustrated at L in FIG. 23. If the overlap distance exceeds approximately one-fifth of the length of the major cutter disc axis, as it does at L in FIG. 23, the cutting effectiveness of the cutters is not diminished. It is only where the overlap distance is less than this that the cutting effectiveness of the assembly is impaired.

Figure 25:
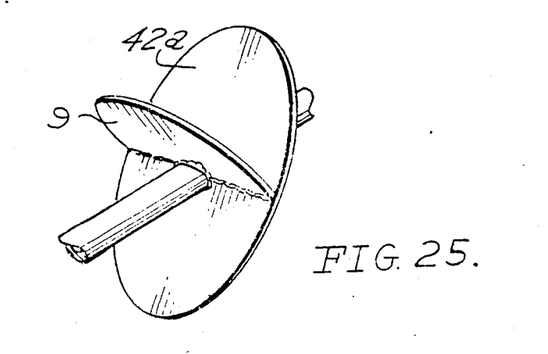
FIG. 25 is a fragmentary, perspective view of the FIG. 24 assembly showing the end blade to the left in that assembly and the additional cutting element attached thereto.

While most of the figures of the attached drawings are not accurately drawn insofar as the above-indicated disc angle and degree of overlap are concerned, it will be appreciated that, as in the case of most patent drawings, they are primarily pictorial and not intended to be dimensionally precise. FIGS. 23 and 24, however, have been drawn with dimensional accuracy with respect to the disc angle and overlap features.

Where a cutter assembly such as that of any of the cutter disc embodiments illustrated in FIGS. 1-23 is employed, there will be some ripple effect on the cut path at each side due to the fact that there is incomplete overlap of the reciprocation ranges of the end cutter discs. This is not particularly disadvantageous in the case of smaller mowers intended for domestic use in open areas because it is a simple matter to overlap the edge of each run in order to eliminate the ripple. Where the mower is used close to buildings, fences, and the like, however, it is not possible to eliminate the ripple without employing some other mowing or cutting means. In the case of larger, commercial mowers, moreover, this ripple effect is a more serious matter. Furthermore, particularly in the case of these larger mowers, there is a certain amount of imbalance in the blades of such a cutter assembly, which is hard on the bearings of their supporting shaft. I have determined that these shortcomings can be minimized by the attachment of a cutting element, shaped generally like the longitudinal half of one of the cutter discs, to the common shaft and transversely across each terminal cutter disc of the assembly. Each of these cutting elements is positioned to extend oppositely away from the common shaft axis at the same angle, and for the same distance, as each half of the cutter disc to which it is attached extends. Where a pair of elements are so attached to the cutter assembly, there is complete overlap of the ranges of reciprocation of the end cutter discs along the cutting bar so that the assembly cuts a smoother path than it otherwise would. FIGS. 24 and 25 show a cutter assembly fitted with such cutting elements, the latter being there illustrated at 9. The tilt angle of each of the cutting elements 9 with the axis of the common shaft 35a of the assembly is the numerical equivalent of angle $\alpha$ of FIG. 23, as indicated in FIG. 24, where the tilt angle of the left-hand cutting element is likewise designated by the symbol $\alpha$.

Figure 26:
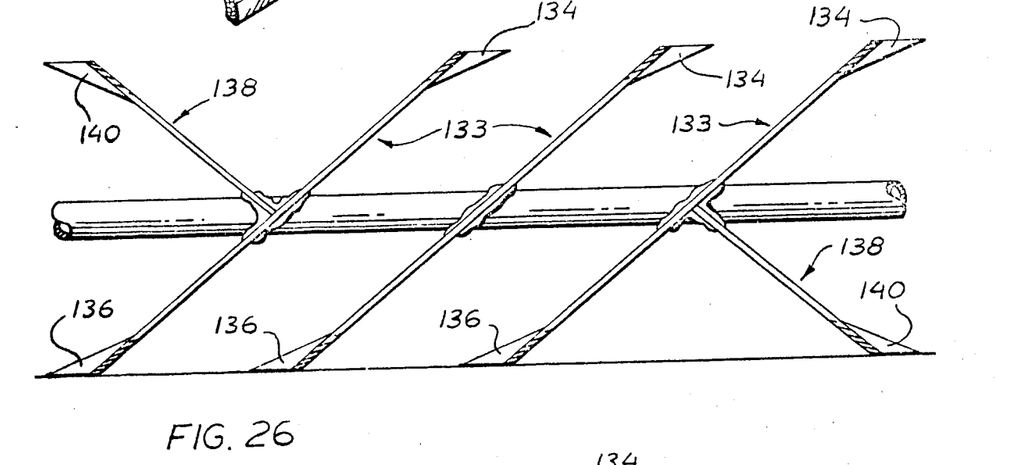
FIG. 26 is a view similar to that of FIG. 24, but showing alternative cutter blade and cutting element configurations to those of the latter figure.
Figure 27:
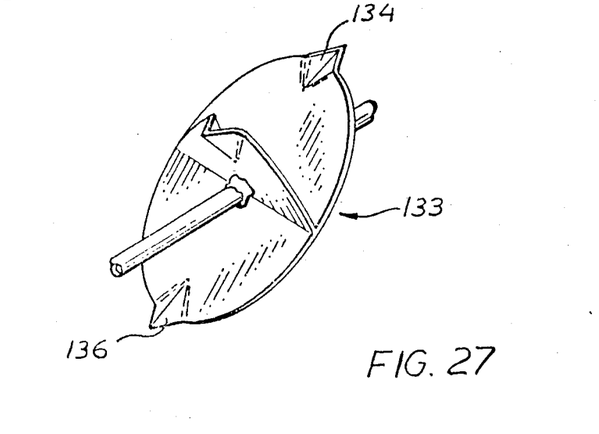
FIG. 27 is a fragmentary, perspective view of the FIG. 26 assembly showing the end blade to the left in that assembly and a cooperating cutting element attached to said blade.

FIGS. 26 and 27 show, at 133, an alternative form of cutter blade or disc in accordance with this invention adapted to produce an exceptionally smooth cut path when employed in a mower as taught herein. This disc embodiment is particularly suitable for use in large commercial mowing machines where the rotary cutter assembly runs slower than, say, the cutter assembly of a small home mower, and it differs from disc 42a of the FIG. 23 assembly only at its ends, where it has a pair of integral, oppositely directed tips 134 and 136 angling away from its two faces in the manner shown. For best results, a rotary cutter assembly with tipped discs of this sort should be equipped with cutting elements of the sort shown at 138, which are similar to cutting elements 9 of the FIG. 24 assembly except for the presence of a tip 140 on each, which tip is the mirror image equivalent of tip 134 or 136 of the disc 13. While the rotary cutter assembly of FIG. 26 produces excellent cut surfaces, it is not as accident-proof as the other cutter assembly embodiments of my invention. It is, however, relatively free of danger when properly used.

Figure 28:
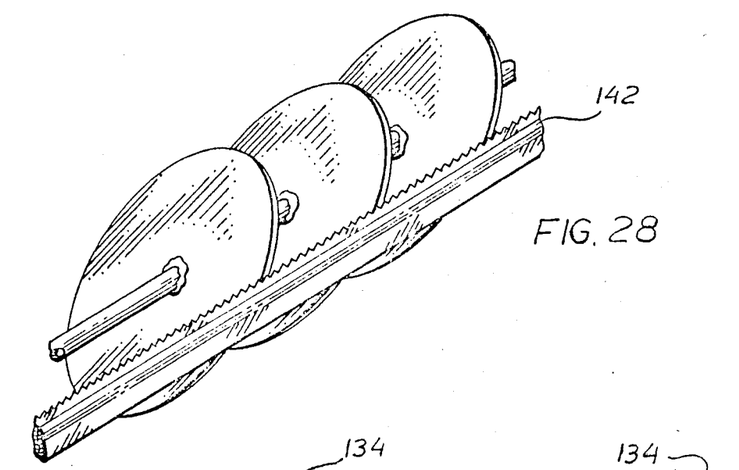
FIG. 28 is a perspective view of the rotary cutting assembly and transverse cutting bar of a mower in accordance with this invention in which the cutting bar has a serrated edge, the position of the mower being such as to clearly reveal this edge.

To insure the neat cutting of grass at its cutting bar elevation, my novel mower can be fitted with a serrated cutting bar. The serrations of such a bar catch and hold the grass blades so that they are clipped at the desired height, whereas a bar with a straight edge sometimes pushes the grass blades and causes them to be cut higher than that. FIG. 28 shows, at 142, a serrated cutting bar on a mower in accordance with this invention.

FIGS. 29-32 and 36 show, at 144, still another embodiment of my novel cutter disc. Cutter disc 144 is not flat like disc 42a, but symmetrically warped in such a way as to meet the edge of its cooperating cutting bar at an angle of intersection of approximately 40° substantially everywhere around its periphery, as seen from above. For this purpose, the disc 144 is formed with a flat transverse center part 146 and a longitudinally extending ridge 147 lying in the same plane as the center part, such plane being taken to represent the general plane of the disc.

Figures 29, 32:
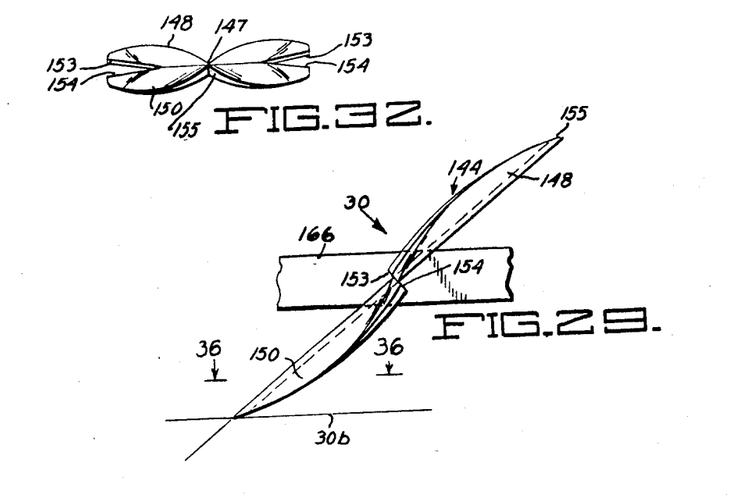
FIG. 29 is a side view of an alternative form of cutter blade in accordance with this invention positioned similarly to the center blade in FIG. 26.
FIG. 32 is an end view of the blade in FIG. 30.
Figure 30:
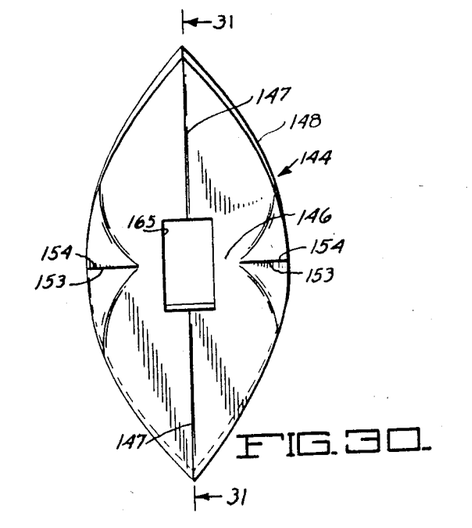
FIG. 30 is a face view of the FIG. 29 blade, taken in the direction of the arrow 30 on FIG. 29.
Figure 31:
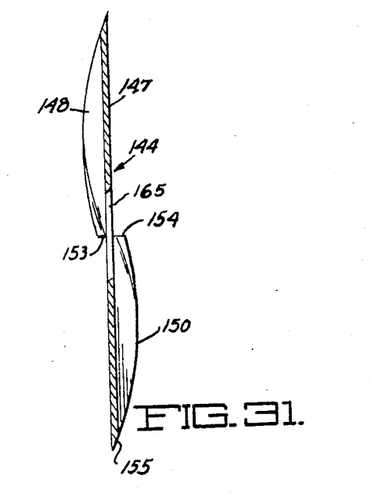
FIG. 31 is a longitudinal sectional view of the blade taken along the line 31—31 of FIG. 30.

The upper segment 148 of the disc 144 curves to the left in FIG. 31 (upwardly in FIG. 32) from opposite sides of the ridge 147 while the lower segment 150 curves to the right from the ridge 147 in FIG. 31 (downwardly in FIG. 32). Also, the adjacent portions of the segments 148 and 150, outwardly from the center section 146, are partially separated by two splits. The resulting facing edges, shown at 153 and 154, are bent outwardly from each other at right angles to the general plane of the disc. Such edges catch any blades of grass that might possibly be moved along the length of a cooperating cutting bar, such as shown at 30b, by the disc and thus carry the blades into cutting engagement with the cutting bar.

As noted, the angle of intersection of the cutting edge 155 of the disc 144 with the cutting bar (see FIG. 36) remains at approximately 40° substantially all of the time during rotation of the disc to insure the uniform cuting of grass throughout such rotation. Also, the cutting edge 155 of the disc is ground or otherwise formed so that at every point of contact with the cutting bar it extends parallel to the length of the cutting bar.

It will be noted that the disc 144 has a rectangular central opening 165 formed therein to fit around a tubular shaft 166 of square cross section. This enables a series of such discs 144 to be mounted on the shaft in proper alignment with each other preparatory to being welded or otherwise secured to said shaft. Obviously, the shaft could be made round in cross section, and the opening in the disc could be made oval, if desired.

Figures 1, 2, 3:
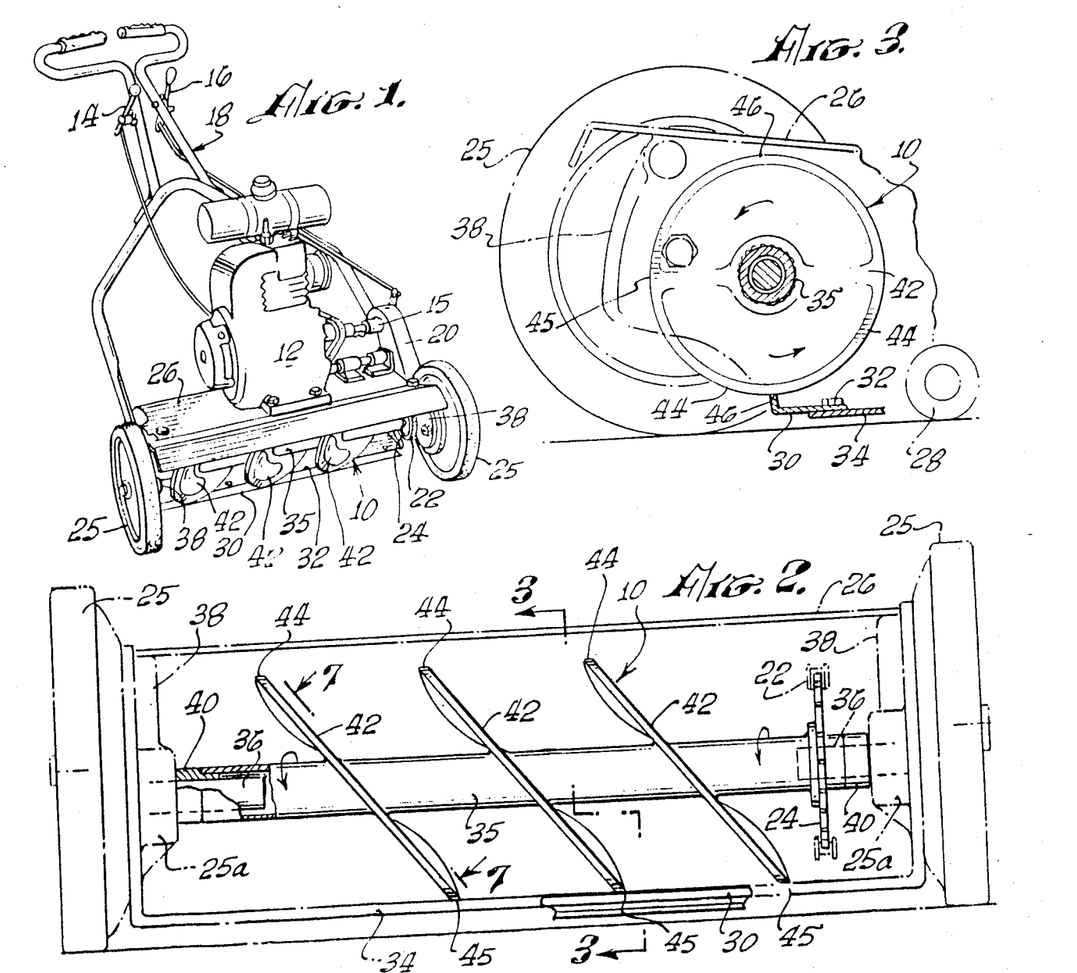
FIG. 1 is a perspective view of an exemplary embodiment of the invention.
FIG. 2 is a front elevation of the rotary cutting assembly of the mower and the cooperating transverse cutting bar.
FIG. 3 is a section along the line 3—3 of FIG. 2.
Figure 33:
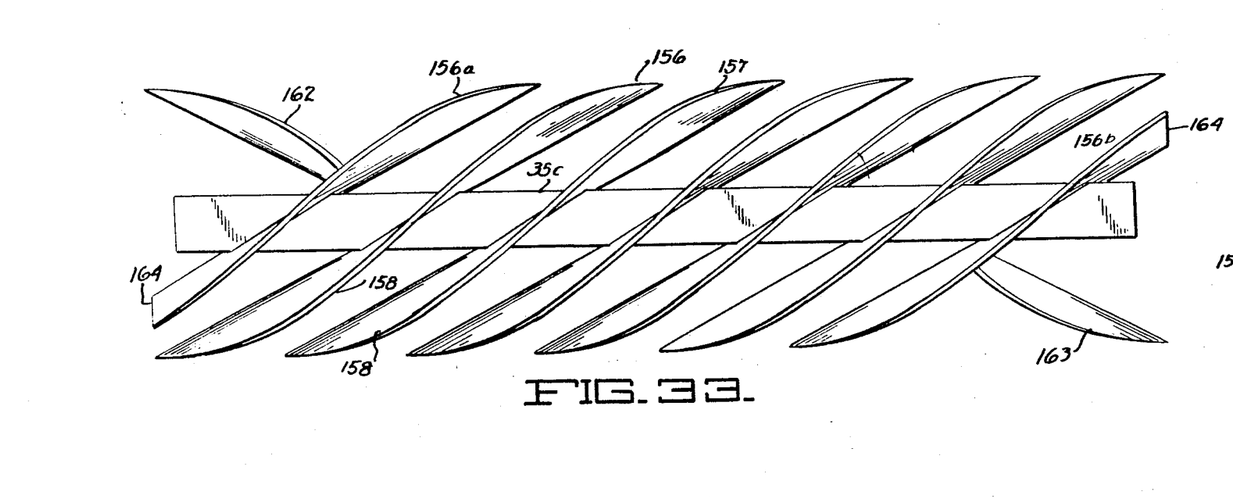
FIG. 33 is a front elevational view of a modified form of rotary cutter assembly in accordance with this invention.
Figure 34:
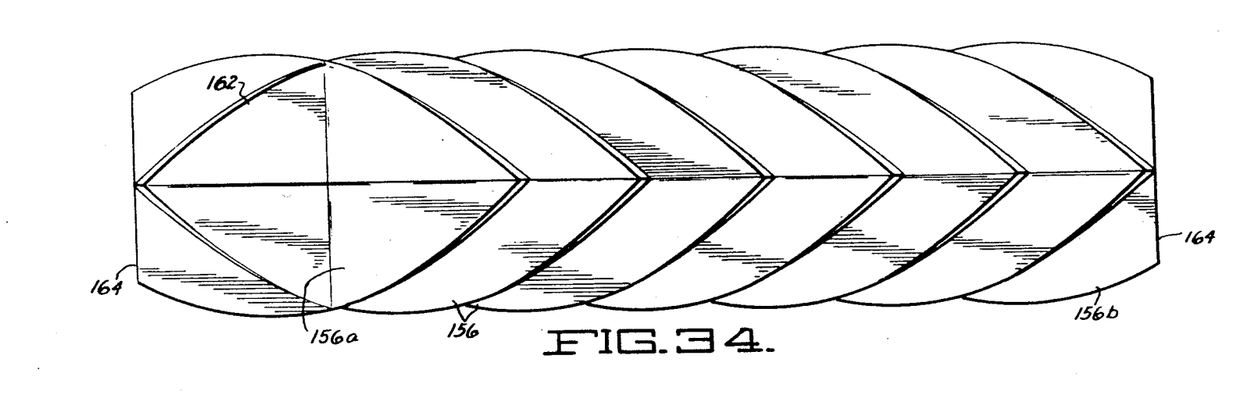
FIG. 34 is a top plan view of the rotary cutter assembly of FIG. 33.
Figure 35:
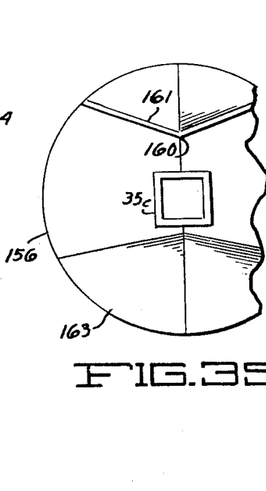
FIG. 35 is a fragmentary end view of the rotary cutter assembly of FIG. 33.
Figure 36:
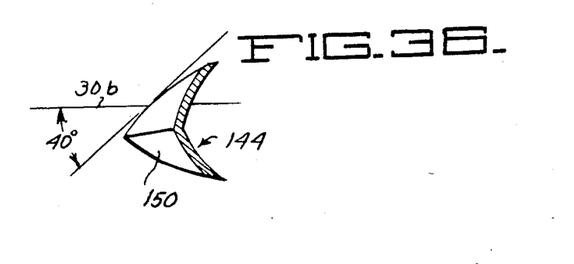
FIG. 36 is a transverse sectional view of the FIG. 29 cutter blade taken along line 36—36 of that figure, but with the blade turned slightly off longitudinal center with respect to a cooperating cutting bar.

FIGS. 33 to 35 illustrate another modified form of the invention in which a number of cutting discs 156, somewhat similar to the disc 144 of FIGS. 29 through 32 and 36, are mounted on a square tubular shaft 35c. The shaft 35c is adapted to be mounted in a mower similarly to the way shaft 35 of FIG. 2 is mounted. In this case, the discs 156 are also formed to provide a cutting intersection of approximately 40 degrees with the cutting bar throughout substantially their entire rotation but they are formed without the above-mentioned splits in the sides of the disc 144 of FIGS. 29 through 32. Also, each disc 156 is formed of segments 157 and 158 on opposite sides of the shaft 35c which, instead of curving outwardly from a central ridge section 160 (FIG. 35), diverge outwardly in flat planes as indicated at 161.

The discs 156 are equally spaced relatively close to each other so that each disc overlaps at least three adjacent discs to insure an even cutting of grass without ripples.

Oppositely disposed semi-discs 162 and 163 are formed integrally with the end discs 156a and 156b at opposite ends of the assembly. Such semi-discs are formed in a manner similar to the full discs and function in the same manner as those shown at 9 in FIG. 24 and 138 in FIG. 26 to insure an even cutting of grass at the opposite sides of the swath by the disc assembly.

It will be noted that the end discs 156a and 156b are cut off at their outer tips as shown at 164 to insure complete overlap of cutting edges around the opposite ends of the disc assembly.

While, as indicated, discs 144 and 156 are designed to intersect a cutting bar at approximately 40° substantially around their peripheries, this angle can vary between about 35° and about 45° within the scope of my invention, with the preferred limits being from about 39° to about 41°, inclusive. Where a cutting disc is flat, rather than being shaped like disc 144 or 156, the angle of intersection between its edge and the cutting bar will vary through a fairly wide range between those portions corresponding, for example, to the flat part of disc 144 and its end tips, so that the grass is not always cut evenly. Where discs of the type shown at 144 and 156 are employed, however, there is always substantially optimum angular relationship between the disc and cutting bar to produce a smooth, even cut.

Figure 37:
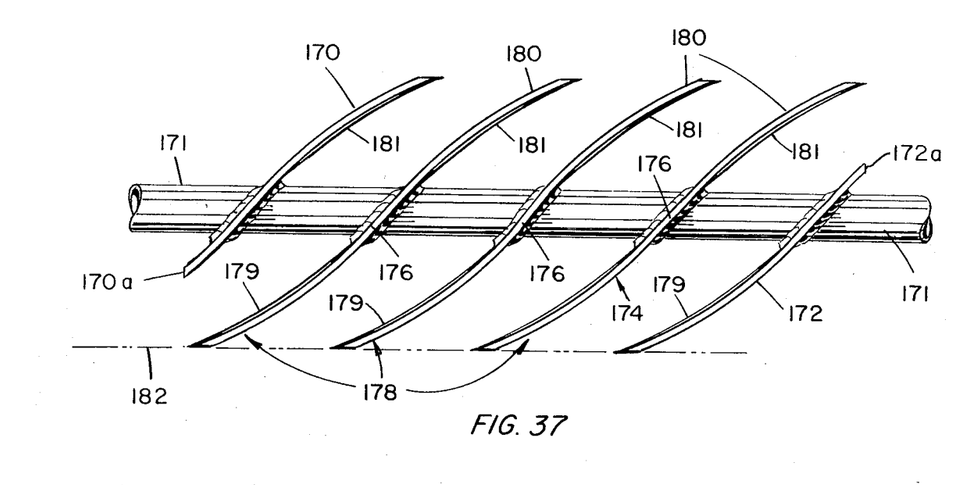
FIG. 37 is a view showing, in front elevation, the blade pattern of another modified form of rotary cutter assembly in accordance with this invention.
Figure 38:
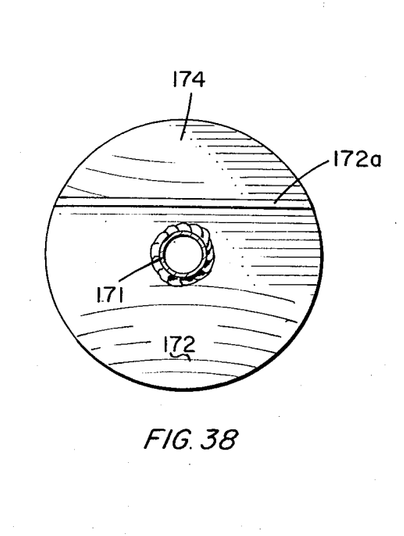
FIG. 38 is a right end elevational view of the rotary cutter assembly blade arrangement of FIG. 37.
Figure 39:
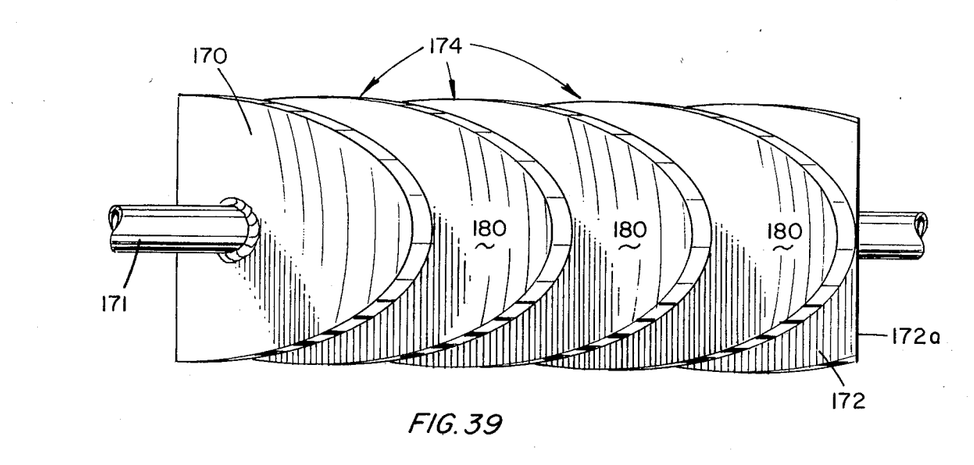
FIG. 39 is a top plan view of FIG. 37.

Still another form of rotary cutter assembly in accordance with this invention is illustrated in FIGS. 37 through 39. This embodiment includes the usual tubular shaft 171, of round cross-section in the present instance, and has five cutting blades. These five blades include three discs 174 somewhat S-shaped in side profile, as seen in FIG. 37, and two end blades 170 and 172, which are truncated versions of the discs 174. Each of the blades 170 and 172 terminates at one end in a transverse edge (170a for blade 170 and 172a for blade 172) situated radially inwardly, toward shaft 171, of the outer tip of the neighboring disc 174, to insure proper overlap of the cutting action of the cutter assembly blades throughout their cutting range.

Each of the discs 174 has a flat, planar midsection 176 separating two oppositely curving sections 178 and 180. As will be observed, the sections 178 and 180 are curved in the longitudinal direction, relative to the major disc axis, and also are slightly twisted, as can be seen at 179 and 181, respectively, on FIG. 37. The degree of longitudinal curvature of the section 178 is identical to that of section 180, but, as indicated, is opposite in direction thereto. The slight twists in sections 178 and 180 are not critical to proper functioning of the discs and can be dispensed with if desired. The midsection of each of the discs 174 is tilted at an angle of approximately 40° with the axis of the assembly. This angle corresponds to the angle $a$ of the FIG. 23 blade assembly and, as in the case of the latter, could vary between about 35 and about 45 degrees. For best results, however, it should be between about 39 and about 41 degrees.

After much experimentation with different blade shapes, I have found the S-shaped curvature of the discs of the present embodiment of my rotary cutter assembly to be far superior to any other of the blade forms tested in providing effective cutting or shearing interaction between the discs and cutting bar of the mower, throughout the entire cycle of disc rotation, to produce a smoothly cut swath of grass or the like minus unsightly ripples. For illustrative purposes, the edge of a cutting bar positioned for use with the FIG. 37 cutter assembly is indicated at 182 on that figure.

The above conclusion in re my S-shaped cutter discs is supported by the performance data of a powered hand mower provided with a rotary cutter assembly like that illustrated in FIGS. 37 through 39 (and actually used as the model for those drawings), which was built and field tested under my supervision. As with other embodiments of my invention, I have proven this experimental prototype to be entirely safe by thrusting my hand into the zone of operation of its rotating blades. The blades merely pushed my hand out of the way without any injury, or even discomfort, thereto.

In addition to their ability to produce smooth, ripple-free surfaces on lawns and the like, the S-shaped discs of FIGS. 37 through 39 can, by virtue of their unusual curvature, be made relatively thin since that curvature helps preserve their structural integrity without the need of added thickness (and resulting weight increase). Thus, such discs do not have to be as thick and heavy as their flat counterparts for adequate strength and rigidity, and this results in a significant reduction in blade manufacturing cost, while yielding a lighter weight mower with reduced energy (lower engine horsepower) requirements. In this connection, the discs of my FIG. 37 prototype cutter assembly were approximately 10 inches long, yet only ⅛-inch thick. By contrast, flat blades in accordance with this invention of the same length must be of from 3/16- to ¼-inch thickness to give them adequate strength and rigidity for their intended purpose.

The field testing of the above-mentioned prototype mower was carried out under extremely difficult conditions. Its most spectacular success was achieved in the test mowing of a thick, rank growth of St. Augustine grass, a variety of lawn grass popular in Florida and found in other Sun Belt regions of the United States. Its growth habit is such as to produce a tangled mat of tough, coarse-bladed stolons or runners, ordinarily referred to as thatch, which offers great resistance to the cutting operation of conventional mowers, particularly of the reel-type, even when the grass is frequently mowed at low mower settings. St. Augustine grass grows rapidly in hot weather, moreover, and when it is well-watered and mowing is neglected for even a relatively short period of time at hot summer temperatures, it becomes a rough obstacle course for even a high-powered rotary mower. I tested my prototype mower on such an overgrown lawn with a seven-inch stand of grass, and was surprised to find that it worked its way through the tall grass with seemingly little effort (even, for example, cutting the grass when its engine was idling). All the more remarkable was the fact that the mower was powered by a Briggs & Stratton gasoline engine of only 2 h. p.

It was noted that the S-shaped cutter discs of my prototype mower kept grass clippings and debris clear of the cutting bar of the mower during the above-described test, thereby permitting its cutter assembly to travel through the grass without any buildup of matted clippings or the like in the cutting area. A reeltype mower would require a 5 h.p. engine for the mowing of such a lawn, and even then would be vulnerable to stalling because of the large volume of grass clippings generated by the mowing operation and the tendency of these clippings to build up in the cutting area and interfere with the operation of the reel. A rotary mower would likewise require a much more powerful engine than my prototype mower (and a blade speed on the order of 5000 rpm) for use on the above-described lawn. When St. Augustine grass is green, healthy and overgrown, its mowed clippings have sufficient moisture to pack together on mower parts and compound the difficulties of any mowing operation with conventional equipment. Anyone who has ever attempted to mow a heavy growth of St. Augustine grass with a conventional mower can appreciate the remarkable achievement of my mower in cutting its way through such grass with seemingly effortless ease and no stalling difficulties.

I do not completely understand why my mower will so effectively outperform its more powerful conventional counterparts, but have observed that it, in fact, does so. Another advantage of my mower is an inherent ability to push foreign objects harmlessly out of the way when it encounters them in an area being mowed, unlike a reel or rotary mower which could be jammed or damaged by such objects, or, as previously indicated, constitute a hazard to nearby persons when it encounters them.

As will be apparent, my novel mower invention can take any of a great number of forms. It can, for example, be embodied in lawn mowers of any type, commercial or otherwise, including large mowers with gangs of rotary assemblies of the sort used on golf courses, school grounds, parks, and other areas of large expanse. Mowers in accordance with this invention can be powered in any fashion, and can vary in size from small hand-powered home mowers to the largest commercial machines driven by gasoline, hydraulic, or other suitable power means. Needless to say, any blade or disc design within the scope of my invention can be employed in either the completed mower or conversion kit described herein. Likewise, any number of cutter blades or discs suitable for the purpose can be employed on my novel rotary cutter assembly within the scope of the invention. The addition of spines in the form of fins or ribs to the cutter blades or discs to enhance their versatility for use in snow thrower embodiments of my invention also falls within the scope of the invention.

So that there will be no misunderstanding as to its meaning, the term "disc", as employed herein, is intended to broadly include all blade forms of my rotary cutter assembly, even though such forms do not, strictly speaking, fit within the literal definition of that term. This somewhat loose usage of the term is believed proper in view of the fact that I know of no more suitable expression for my purpose, and, further, because this choice of language, when construed in the light of the appended drawings and this note of explanation, is believed to be free of confusion or ambiguity insofar as the scope of the present invention is concerned.

While selected embodiments of my invention have been described and illustrated in detail herein, it should be emphasized that the invention is not limited to those embodiments but is commensurate in scope with the language of the following claims.

I claim:

1. In a mower having a frame mounted on ground wheels with a transverse cutting bar on the frame at a selected cutting height above ground level and with a rotary cutter assembly cooperative with the transverse bar for cutting operation, the improvement to eliminate hazard to the operator by the cutting operation comprising:

said rotary cutter assembly having a plurality of outer circumferential cutting edges spaced along the transverse bar of circular profile configuration as seen along the axis of the rotary cutter assembly, and said circumferential edges being operative to shift along the bar in response to rotation of the rotary cutter assembly thereby to make the cutting operation nonhazardous by pushing away from the cutting operation any part of the operator's body that may inadvertently intrude into the zone of the cutting operation, said rotary cutter assembly including arrays of resilient filaments thereon extending beyond its rotary cutting edges to brush against the cutting bar and thus flick loose material rearwardly from the zone of the cutting operation.

2. A combination as set forth in claim 1
which includes a blower to entrain the flicked loose material, and
which includes means to control the operation of the rotary cutter assembly, and
which includes additional means to control the blower independently of the rotary cutter assembly to permit the blower to be idle while the rotary cutter assembly is in operation thereby to accumulate grass cuttings and other loose material on the intake side of the blower and to permit the blower to be subsequently energized to discharge the accumulated loose material in mass.

3. In a mower having a frame mounted on ground wheels with a transverse cutting bar on the frame at a selected cutting height above ground level and with a rotary cutter assembly cooperative with the transverse bar for cutting operation,
the improvement to eliminate hazard to the operator by the cutting operation comprising:
said rotary cutter assembly having a plurality of outer circumferential cutting edges spaced along the transverse bar of circular profile configuration as seen along the axis of the rotary cutter assembly,
said circumferential edges being edges of a plurality of separate discs, each of said discs being in a plane at an acute angle to the axis of rotation of said rotary cutter assembly and being of elongated configuration to wobble along the cutting bar in response to rotation about the axis, the opposite end edges of the elongated discs being oppositely beveled to maintain flat contact with the cutting bar,
said circumferential edges being operative to shift along the bar in response to rotation of the rotary cutter assembly thereby to make the cutting operation nonhazardous by pushing away from the cutting operation any part of the operator's body that may inadvertently intrude into the zone of said cutting operation,
the manner of operation of said rotary cutter assembly being such that the two halves of each wobbling disc in turn advance along the cutting bar in opposite directions, and
said rotary cutter assembly includes two arrays of resilient filaments on the opposite faces respectively of each wobbling disc,
the two arrays being on the trailing faces of the two halves respectively of the disc,
said mower functions in such manner that the discs of said rotary cutter assembly rotate in the same direction as said ground wheels, and
said filaments are positioned on the discs to extend beyond the periphery of the discs to be flexed by the cutting bar and thus flick loose material rearwardly from the zone that is rearward of the cutting bar.

4. A combination as set forth in claim 3
which includes a blower to entrain the flicked loose material, and
which includes means to control the operation of the rotary cutter assembly, and
which includes additional means to control the blower independently of the rotary cutter assembly to permit the blower to be idle while the rotary cutter assembly is in operation thereby to accumulate grass cuttings and other loose material on the intake side of the blower and to permit the blower to be subsequently energized to discharge the accumulated loose material in mass.

5. In a mower having a frame mounted on ground wheels with a transverse cutting bar on the frame at a selected cutting height above ground level and with a rotary cutter assembly cooperative with the transverse bar for cutting operation, the improvement in which:
said rotary cutter assembly has a plurality of outer circumferential cutting edges spaced along the transverse bar of generally circular profile configuration as seen along the axis of the rotary cutter assembly,
said circumferential edges being edges of a plurality of separate discs, each of said discs being in a plane at an angle of from about 39° to about 41° to the axis of rotation of said rotary cutter assembly and being of elongated configuration to wobble, and thereby cause the circumferential edges to reciprocate, along the cutting bar in response to rotation about said axis, the opposite end edges of the elongated discs being oppositely beveled to maintain flat contact with the cutting bar and the spacing of said discs being such that the ranges of reciprocation of their circumferential cutting edges along said cutting bar overlap, and
each of said discs having extending tips at its opposite ends adapted to increase the reach of the disc along the cutting bar for a greater range of reciprocation therealong and a more effective cutting action to produce a smooth, even appearance of the surface cut by the mower.

6. In a mower having a frame mounted on ground wheels with the transverse cutting bar on the frame at a selected cutting height above ground level and with a rotary cutter assembly cooperative with the transverse bar for cutting operation,
the improvement to eliminate hazard to the operator by the cutting operation comprising,
said rotary cutter assembly having a plurality of outer circumferential cutting edges spaced along the transverse bar of circular profile configuration as seen along the axis of the rotary cutter assembly,
said cutting edges being the edges of a plurality of discs, each of said discs being in a plane at an acute angle to the axis of rotation of said rotary cutter assembly and being of elongated configuration to wobble along the cutting bar in response to rotation about the axis,
said circumferential edges being operative to shift along the bar in response to rotation of the rotary cutter assembly thereby to make the cutting operation nonhazardous by pushing away from the cutting operation any part of the operator's body that may inadvertently intrude into the zone of said cutting operation,
the aforesaid discs being offset to form concave recesses in the faces of the discs, there being oppositely facing recesses on the two halves respectively of each disc.

7. A kit for converting a hazardous conventional reel-type lawn mower into a nonhazardous lawn mower, wherein the conventional lawn mower has a transverse cutting bar and has a reel with cutting edges cooperating with the cutting bar, the reel being journaled in bearings of the mower,
said kit comprising a rotary cutter assembly to be substituted for said reel, said rotary cutter assembly having a shaft dimensioned to be journaled in said bearings, said cutter assembly having a plurality of cutting edges spaced along the cutting bar in constant contact therewith to cooperate therewith for cutting action, said cutting edges being of circular profile configuration as seen along the axis of rotation of the assembly and being operative to move along the bar for cutting action in response to rotation of the assembly, thereby to make the cutting operation safe by pushing away from the cutting operation any part of the operator's body that may inadvertently intrude into the zone of the cutting operation, said kit including arrays of resilient filaments on the rotary cutter assembly extending beyond the rotary cutting edges to brush against the cutting bar and thus flick loose material rearwardly from the zone of the cutting operation.

8. A kit for converting a hazardous conventional reel-type lawn mower into a nonhazardous lawn mower, wherein the conventional lawn mower has a transverse cutting bar and has a reel with cutting edges cooperating with the cutting bar, the reel being journaled in bearings of the mower, said kit comprising a rotary cutter assembly to be substituted for said reel, said rotary cutter assembly having a shaft dimensioned to be journaled in said bearings, said cutter assembly having a plurality of cutting edges spaced along the cutting bar in constant contact therewith to cooperate therewith for cutting action, said cutting edges being of circular profile configuration as seen along the axis of rotation of the assembly and being operative to move along the bar for cutting action in response to rotation of the assembly, thereby to make the cutting operation safe by pushing away from the cutting operation any part of the operator's body that may inadvertently intrude into the zone of the cutting operation, said cutting edges being the edges of a plurality of discs, each of said discs being in a plane at an acute angle to said axis of rotation and being of elongated configuration to wobble along the cutting bar in response to rotation about the axis, said discs being offset to form concave recesses in the faces of the discs, there being oppositely facing recesses on the two halves respectively of each disc.

9. A kit for converting a hazardous conventional reel-type lawn mower into a nonhazardous lawn mower, said conventional lawn mower having a transverse cutting bar and a reel with cutting edges cooperating with the cutting bar, the reel being journaled in bearings of the mower, said kit comprising a rotary cutter assembly to be substituted for said reel, said rotary cutter assembly having a shaft dimensioned to be journaled in said bearings, said cutter assembly having a plurality of cutting edges spaced along the cutting bar in constant contact therewith to cooperate therewith for cutting action, said cutting edges being of circular profile configuration as seen along the axis of rotation of the assembly and being operative to move along the bar for cutting action in response to rotation of the assembly, thereby to make the cutting operation safe by pushing away from the cutting operation any part of the operator's body that may inadvertently intrude into the zone of said cutting operation, said cutting edges being circumferential edges of a plurality of elongated discs, each of said discs being in a plane at an angle of from about 39 to about 41 degrees to said axis of rotation to wobble, and thereby cause the circumferential edges to reciprocate, along the cutting bar in response to rotation about said axis, the spacing of said discs being such that the ranges of reciprocation along the cutting bar of the cutting edges on adjacent discs of the rotary cutter assembly in response to rotation of the assembly overlap each other by a distance of at least approximately one-fifth the length of the major axis of said discs, said rotary cutter assembly including, in addition to said discs, a pair of cutting elements, each having a shape generally similar to that of half of one of said discs, each of said cutting elements being mounted at an opposite end of said rotary cutter assembly so as to extend away from the transverse center of an end disc in mirror image symmetry with half of said disc whereby the range of reciprocation of the cutting element overlaps that of the laterally outwardly extending half of said end disc during operation of said rotary cutter assembly to thereby reduce any ripple effect that would otherwise occur along the edges of the cut path of said mower.

10. In a mower having a frame mounted on ground wheels with a transverse cutting bar on the frame at a selected cutting height above ground level and with a rotary cutter assembly cooperative with the transverse bar for cutting operation, the improvement to eliminate hazard to the operator by the cutting operation in which:

said rotary cutter assembly has a plurality of outer circumferential cutting edges spaced along the transverse bar of circular profile configuration as seen along the axis of the rotary cutter assembly, said circumferential edges being edges of a plurality of separate discs, each of said discs being in a plane at an angle of from about 39 to about 41 degrees to the axis of rotation of said rotary cutter assembly and being of elongated configuration to wobble, and thereby cause the circumferential edges to reciprocate, along the cutting bar in response to rotation about said axis, the opposite end edges of the elongated discs being oppositely bevelled to maintain flat contact with the cutting bar, the spacing of the discs of said rotary cutter assembly being such that the ranges of reciprocation along the cutting bar of the cutting edges on adjacent discs in response to rotation of the assembly overlap each other by a distance of at least approximately one-fifth the length of the major axis of said discs, whereby said circumferential edges shift along the bar in response to rotation of the rotary cutter assembly in such a way as to make the cutting operation nonhazardous by pushing away from the cutting operation any part of the operator's body that may inadvertently intrude into the zone of said cutting operation, said rotary cutter assembly including, in addition to said discs, a pair of cutting elements, each having a shape generally similar to that of half of one of said discs, each of said cutting elements being mounted at an opposite end of said rotary cutter assembly so as to extend away from the transverse center of an end disc in mirror image symmetry with substantially half of said disc whereby the range of reciprocation of the cutting element overlaps that of the laterally outwardly extending half of said end disc during operation of said rotary cutter assembly to thereby reduce any ripple effect that would otherwise occur along the edges of the cut path of said mower.

11. In a mower having a frame mounted on ground wheels with a transverse cutting bar on the frame at a selected cutting height above ground level and with a rotary cutter assembly cooperative with the transverse bar for cutting operation, the improvement to eliminate hazard to the operator by the cutting operation in which:

said rotary cutter assembly has a plurality of outer circumferential cutting edges spaced along the transverse bar of circular profile configuration as seen along the axis of the rotary cutter assembly, said circumferential edges being edges of a plurality of separate discs, each of said discs being of elongated configuration to wobble, and thereby cause the circumferential edges to reciprocate, along the cutting bar in response to rotation about said axis, the opposite end edges of the elongated discs being oppositely bevelled to maintain flat contact with the cutting bar and each of said discs being so shaped that its circumferential edge meets the cutting bar at an angle of approximately 40° at substantially every point therearound, as seen from above, whereby, as a result, the surface cut by the mower is uniformly smooth and free of ripples, the spacing of said discs being such that the ranges of reciprocation of their circumferential cutting edges along said cutting bar overlap, each of said discs being split across a portion of its width to form facing edges and said facing edges being spaced from each other in a direction at right angles to the plane of said disc whereby to guide blades of material being mowed against said cutting bar, whereby said circumferential edges shift along the bar in response to rotation of the rotary cutter assembly in such a way as to make the cutting operation nonhazardous by pushing away from the cutting operation any part of the operator's body that may inadvertently intrude into the zone of said cutting operation.

* * * * *